Feb. 23, 1965  E. F. MANGIS  3,170,454
TILE AND MASONRY SAW
Filed May 23, 1962  2 Sheets-Sheet 1

Elmer F. Mangis
INVENTOR.

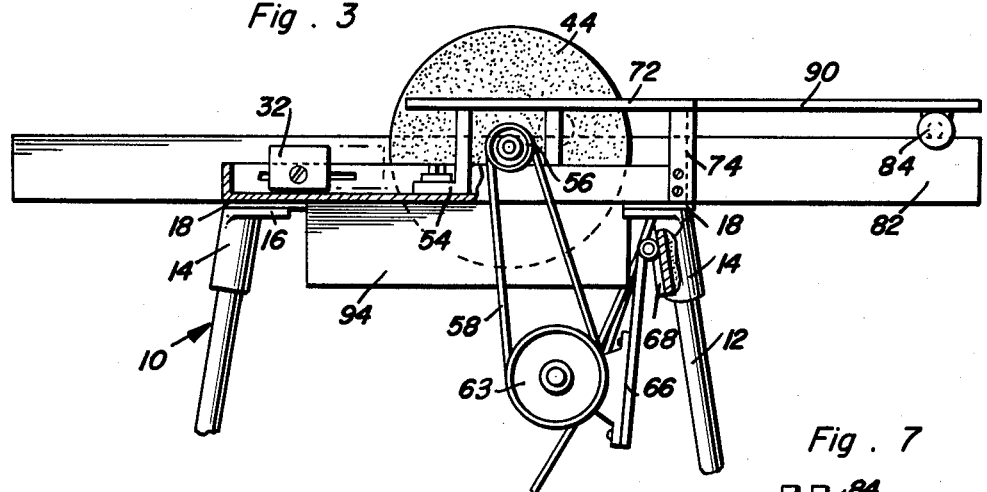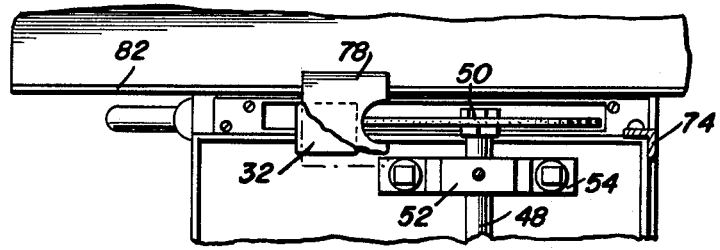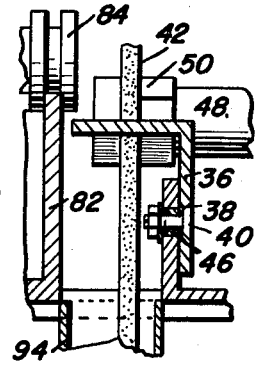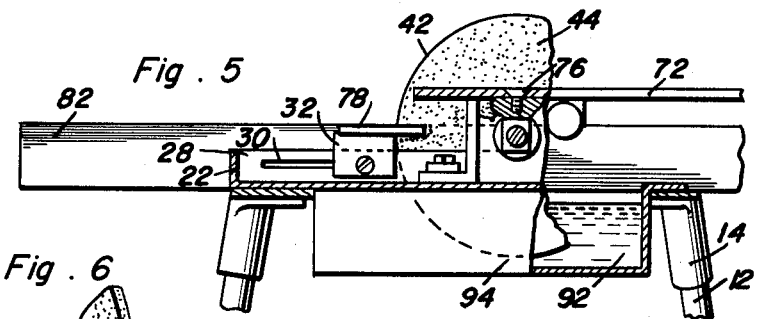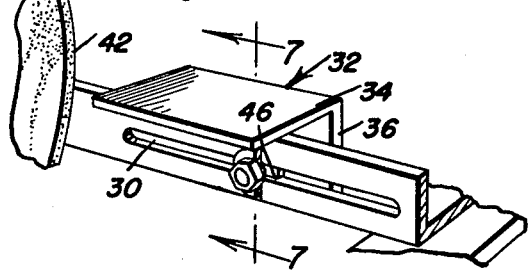
Elmer F. Mangis
INVENTOR.

United States Patent Office 3,170,454
Patented Feb. 23, 1965

3,170,454
TILE AND MASONRY SAW
Elmer F. Mangis, Frankfort, Ind., assignor to E & R Manufacturing Co., Inc., Kirklin, Ind., a corporation of Indiana
Filed May 23, 1962, Ser. No. 197,040
4 Claims. (Cl. 125—13)

The present invention generally relates to saws, and more particularly to a tile and masonry saw capable of cutting tiles to any of a wide range of desired shapes through the use of a single blade or wheel.

One of the primary objects of the present invention involves the provision of a device capable of shaping tiles to close tolerances.

Another object of the present invention involves the elimination of the necessity of using a separate wheel or blade to cut contours of various designs.

Further, an object of the present invention involves the provision of a device capable of cutting a wide range of different size tiles.

Also, an object of the present invention involves the provision of a traveling table so as to facilitate the accurate cutting of a tile.

Additionally, an object of the present invention is the provision of a traveling table which can, if so desired, be stabilized in one position so as to allow for the movement of the tile relative to the table.

Another object of the present invention involves the provision of an auxiliary rest so as to enable the shaping of the tile on the cutting edge of the blade.

A further object of the present invention resides in the provision of a tile saw which is highly compact, portable, easy to operate and maintain, and relatively inexpensive to manufacture, while at the same time being highly efficient for its intended purpose of both cutting and trimming various tile and masonry members.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a partial elevational view of the device of FIGURE 1 looking rearwardly;

FIGURE 4 is a partial top plan view illustrating the positioning of the rest for the shaping of a tile on the cutting edge of the wheel or blade;

FIGURE 5 is a partial elevational view of FIGURE 4 with portions broken away;

FIGURE 6 is a partial perspective view of the adjustable rest and its relation to the blade; and FIGURE 7 is an enlarged cross-sectional view taken substantially on a plane passing along line 7—7 in FIGURE 6.

Figure 1:
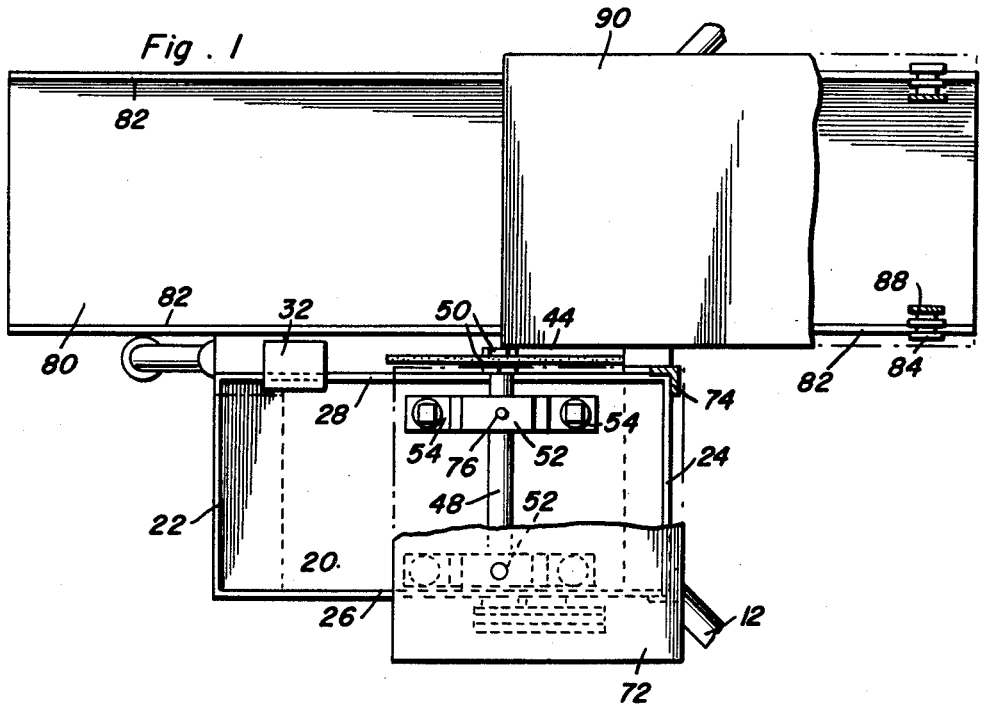
FIGURE 1 is a top plan view of the present invention with portions broken away so as to illustrate the supporting structure.

Referring now more specifically to the drawings, reference numeral 10 generally designates the supporting structure of the present device. This supporting structure has been illustrated as consisting of three supporting legs 12, the lower ends of which are adapted to engage a supporting surface, and the upper ends of which are engaged within tubular socket members 14, the upper ends of the socket members 14 being folded over as at 16 and secured to flat transversely extending plates 18 in any conventional manner. However, the present invention is intended to also encompass any other equivalent supporting structure capable of locating and maintaining the device in the desired position.

Superimposed on the supporting base 10 is a substantially rectangular tray 20 secured thereto in any conventional manner such as welding, and extending from front to rear on one side of the support 10. It will be noted that this tray is provided with upstanding peripheral flanges consisting of a front flange 22, a rear flange 24, an outside flange 26 and an inside flange 28. The inner flange 28 is provided with a longitudinally extending slot 30 which is intended to act as a guide for the forward and rearward adjustment of a rest member 32 provided with a flat upper surface 34 and a depending leg 36. An aperture 38 is formed in the depending leg 36 for the reception of a releasable fastener 40 which extends through both the leg aperture 38 and the flange slot 30 so as to enable the fixing of the rest in a plurality of adjusted positions relative to the cutting edge 42 of the saw or wheel 44. If so desired, a spacer or washer 46 can be provided within the slot 30 so as to stabilize the adjustable fastening member 40.

The tile cutting blade or wheel 44 is positioned outside of the inner flange 28 and supported on an elongated rotatable shaft or mandrel 48. Collar means 50 secure the blade 44 to the shaft 48 in a manner so as to provide for the rotation of the blade 44 upon the rotation of the mandrel 48. This mandrel 48 extends transversely across the tray 20 and is rotatably journaled in a pair of bearing blocks 52 which are in turn fixed to the upper surface of the tray 20 by angle members 54 which can be secured thereto by either threaded fastening means or welding.

The other end of the rotatable mandrel 48 extends beyond the outer flange 26 and is provided with a sheave 56 which receives an endless drive belt 58, the other end of which is wound about a drive sheave 60 secured to a drive shaft 62 of a motor 64 mounted below the tray 20 on a mounting board 66 secured to a transverse plate 68 forming a part of the supporting structure 10. A conventional switch means 70 is provided for the actuation of the device.

Supported over the tray 20 and the shaft 48 is a fixed table 72 supported at its rear end by two depending angle irons 74 secured to the upstanding flanges on the tray 20, as well as the upper surface of the bearing blocks 52 and angles 54 to which it is secured in any conventional manner such as by welding or flat headed screws 76. As noted in the drawings, the upper surface of the fixed table 72 is positioned well above the flat upper surface 34 of the rest 36 so as to enable the use of the table 72 without interference from the rest 32, and conversely, to enable the use of the rest 32, particularly for the grooving or notching of a tile 78, as illustrated in FIGURE 4, without interference from the table 72.

Figure 2:
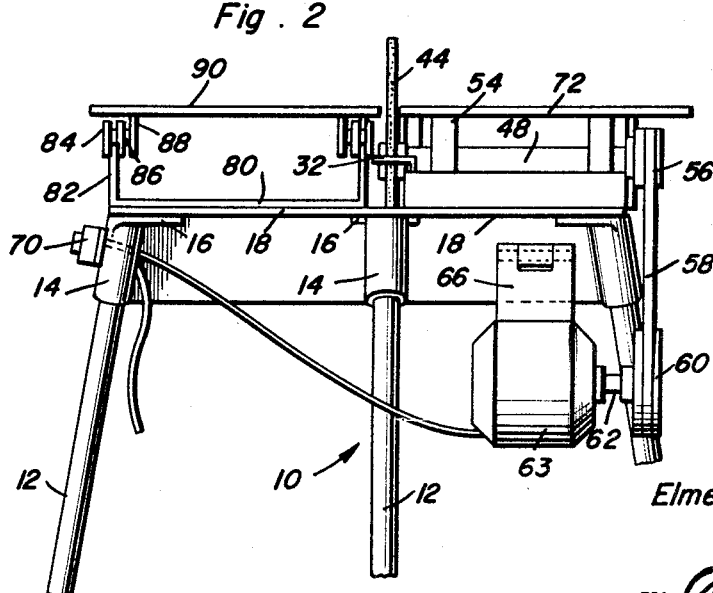
FIGURE 2 is a partial elevational view looking from the lef hand side of the device in FIG. 1.

On the other side of the blade or wheel 44, a flat longitudinally extending channel 80 is provided. This channel 80 is provided with two longitudinally extending side flanges 82 which function as tracks for the reception of the rotatable wheels 84 mounted on horizontally extending axles 86 which are in turn secured to a traveling table 90 by depending leg 88. As illustrated in FIGURES 2 and 3, this traveling table 90 is of even height with the fixed table 72. The top of the traveling table 90 can, if so desired, be provided with an upper surface or covering of a material such as rubber so as to help stabilize a tile or panel being cut. However, it will be noted that the downward movement of the cutting edge 42 of the blade 44 will tend to maintain the position of the object being cut. Further, if deemed desirable, the top of the table 90 can also be provided with a gauge thereby facilitating the cutting of the desired sizes. Further, in regard to this traveling table 90, attention is directed to the fact that the traveling table 90 can be fixed in one position by a conventional locking means (not illustrated) so as to enable the movement of an object being cut relative to the upper surface of both tables 72 and 90 thereby enabling the cutting of larger panels than would be possible by merely manipulating the panel through the blade by the movement of the traveling table 90.

It is contemplated that the present invention can be used either wet or dry. If used wet, a suitable coolant 92 can be provided in any suitable manner such as by the use of a tank 94 positioned beneath the blade 44 and supported on the framework 10.

From the foregoing, it is considered to be readily apparent that a novel saw has been defined which is specifically effective for the cutting and shaping of large and small tile sections, marble slabs and panels, slate panels, slate shingles, gypsum board and various other similar materials. The provision of a traveling table enables a straight cut to be made conveniently and quickly with the portion cut-off being received on the fixed table located to the other side of the blade. In addition to the use of the traveling table as a means for manipulating a conventional tile section, generally 12″ x 12″, it has been pointed out that the traveling table can be locked in one position so as to enable the cutting of larger panels by the manual movement of the panel through the blade relative to both the fixed table and the locked tilting table. The manner in which the blade protrudes above both tables provides for the cutting on the front side of the blade which tends to keep the material being cut in contact with the table in addition to making the following of a mark on the material easier.

In addition to these tables, the device is additionally provided with an adjustable rest which is positioned below the tables and in line with the cutting edge of the blade thereby enabling the user of the device to, as illustrated in FIGURE 4, position a tile on the upper or supporting surface of the rest and manipulate the tile against the cutting edge of the blade so as to form various configurations such as grooves or notches. This rest, as set forth supra, can be adjusted toward and away from the cutting edge of the blade as the various circumstances might dictate. Attention is also directed to the fact that if the forming of a convex contour is desired, the tile may be positioned on the traveling table and formed on the side of the blade. Thus, the novel structure defined herein enables the cutting and shaping of tiles into any conceivable shape and to close tolerances by the use of a portable and relatively simple means which is thought to be a significant advance in the art.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A masonry saw comprising a base, a vertically orientated circular masonry cutting blade, means rotatably mounting said blade centrally on said base, motor means for effecting a rotation of said blade, a first horizontally orientated flat table fixedly secured to said base adjacent a first side of the blade and in a horizontal plane above the center of rotation of said blade, a second horizontal flat table orientated in the same plane as said first table adjacent the other side of the blade, said tables each having a forward edge parallel to the rotary axis of the blade, means mounting said second table for movement parallel to the cutting blade in said horizontal plane between a first position wherein the forward edge of the second table is located forward of the cutting edge of the blade and a second position wherein the forward edge of the second table is located in general alignment with or to the rear of the cutting edge, a flat horizontally orientated rest, and means mounting said rest in a plane below the plane of the tables and in alignment with and slightly forward of the cutting edge of the blade at the approach side thereof, the forward edge of the fixed table being located approximately on line with that forward portion of the cutting edge located in the same plane as said fixed table.

2. The combination of claim 1 wherein said flat rest is adjustable mounted for movement toward and away from the cutting edge of the blade.

3. The combination of claim 2 wherein that portion of the blade located above the plane of the tables is completely exposed so as to enable a working of masonry units on the side as well as edge of the blade.

4. The combination of claim 2 wherein said flat rest is orientated generally in horizontal alignment with the center of rotation of the blade.

References Cited by the Examiner

UNITED STATES PATENTS

| | | | |
|---|---|---|---|
| 232,000 | 9/80 | Clogston | 125—13 |
| 357,133 | 2/87 | Rudolph | 125—13 |
| 394,594 | 12/88 | Murray. | |
| 897,303 | 9/08 | Pierce | 51—92 |
| 1,748,446 | 2/30 | Gatzsch. | |
| 1,873,721 | 8/32 | Postley | 125—23 |
| 2,052,031 | 8/36 | Merrigan. | |
| 2,464,117 | 3/49 | Coates | 125—13.1 |
| 2,574,499 | 11/51 | Ruscitti et al. | |
| 2,585,957 | 2/52 | Meeker et al. | |
| 2,695,015 | 11/54 | Cooper | 125—13 |
| 2,743,717 | 5/56 | Wilkin | 125—13 |
| 3,008,462 | 11/61 | Williams | 125—13 |

FOREIGN PATENTS

| | | |
|---|---|---|
| 596,977 | 1/48 | Great Britain. |

LESTER M. SWINGLE, *Primary Examiner.*

FRANK E. BAILEY, JOHN C. CHRISTIE, *Examiners.*